Figure 1:
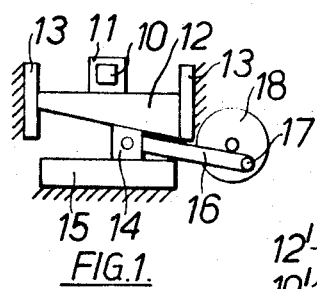

United States Patent [19]

Searle et al.

[11] 3,777,967

[45] Dec. 11, 1973

[54] FRICTION WELDING APPARATUS

[75] Inventors: John Gilbert Searle, Hednesford; David John Hunt, Rugeley, both of England

[73] Assignee: Allwood, Searle & Timney Limited, Digbeth, Walsall, England

[22] Filed: Feb. 10, 1972

[21] Appl. No.: 225,254

[30] Foreign Application Priority Data
Feb. 10, 1971 Great Britain...................... 4,397/71
Apr. 29, 1971 Great Britain................... 12,271/71

[52] U.S. Cl....................... 228/2, 29/470.3, 156/73
[51] Int. Cl............................................. B23k 27/00
[58] Field of Search....................... 228/2; 29/470.3; 156/73

[56] References Cited
UNITED STATES PATENTS
3,469,300  9/1969  Nagin................................. 228/2 X
3,699,639  10/1972  Ditto et al.......................... 29/470.3
3,705,678  12/1972  Searle............................ 29/470.3 X Primary Examiner—J. Spencer Overholser
Assistant Examiner—Robert J. Craig
Attorney—Samuel Scrivener, Jr. et al.

[57] ABSTRACT

In or for friction welding apparatus of the kind in which frictional heat is generated by causing one of the components to be welded to follow repeatedly a given path without rotation while in frictional engagement with the other component, the support for that component has a track, and there is a path inclined at less than 45° to that track, and there is a drive member caused by drive means to reciprocate along the track and path. This causes the component-support to reciprocate in a direction transverse to the track with an amplitude less than that of the drive member. There may be two or three such assemlies of track, path and drive member so arranged that the drive members operate at the same frequency and the path is circular or elliptical. The amplitude of the reciprocation of the drive members and/or the inclination of the paths may be capable of being reduced to zero to enable the components to be centred for welding to be effected.

8 Claims, 12 Drawing Figures ized to enable welding to be effected. The components are then brought into the desired alignment, if they are not already aligned in the desired manner, and are welded together with the application of an appropriate welding force. The welding force is usually, but not always, greater than the force urging the faces into abutment during the generation of heat by friction. A stop may be provided to limit the extent to which the components are moved towards each other when the welding force is applied.

FRICTION WELDING APPARATUS

This invention relates to friction welding apparatus.

In effecting friction welding two components to be welded together are brought into contact and their abutting faces are rubbed together until sufficient heat is generated to enable welding to be effected. The components are then brought into the desired alignment, if they are not already aligned in the desired manner, and are welded together with the application of an appropriate welding force. The welding force is usually, but not always, greater than the force urging the faces into abutment during the generation of heat by friction. A stop may be provided to limit the extent to which the components are moved towards each other when the welding force is applied.

Hitherto friction welding has generally been used for welding together two components which have circular symmetry such as rods or tubes of circular cross-section. The components have been arranged with their axes mutually aligned and one component has been held stationary while the other component has been rapidly rotated about the common axis of the components and urged against the stationary component. Heat has been generated by friction, and when sufficient heat has been generated for welding, the rotating component has been quickly stopped, or the stationary component has been allowed to rotate, so that there has been no longer any relative movement between the components. The components have then been urged together, usually with a greater force than that employed during the frictional generation of heat, so as to effect welding.

This method is usually not suitable for components without circular symmetry, as it is difficult to bring the components into any particular angular relationship before welding is effected. Another disadvantage of the conventional method is that the relative speed of movement of the two rubbing faces during the drictional generation of heat is proportional to the distance from the common axis of the components. Thus, for example, where two rods of circular cross-section are to be welded together there is little or no heat generated at the centres of the abutting faces, while the maximum generation of heat is at the peripheral margins of these faces.

With a view to avoiding these disadvantages it has been proposed to generate frictional heat for welding by moving one component relatively to the other, without relative rotation, while their faces are urged into contact. This kind of movement is referred to as irrotational. In irrotational movement there may be incidental relative rocking movement between the components, but this does not constitute relative rotation. In the generation of frictional heat for welding, using irrotational movement, one component is normally held stationary while the other component is urged against it and is caused either to reciprocate along a linear path in the plane of the abutting faces of the components or to follow repeatedly a closed curve, such as a circle, in that plane. This latter type of movement may conveniently be referred to as orbital movement. When sufficient heat for welding has been generated the components are quickly brought into the desired relationship and are welded together.

The present invention is concerned with apparatus for use in causing one of the components to follow an appropriate path without rotation. The apparatus may be employed with a component-support adapted to hold the other component stationary or it may be used with a component-support adapted to cause the other component to move in some complementary path. Apparatus embodying the invention may be used in welding metal components together or components of other thermoplastic materials such as synthetic resinous materials.

According to the present invention there is provided apparatus operative to move a component in an irrotational manner for the generation of frictional heat for welding, comprising a movable component-support, a track the position of which determines the position of the component-support, a path inclined at less than 45° to the track, a drive member reciprocable along the track and the path and in so doing causing the track to reciprocate in a direction transverse to the track and the path with an amplitude less than that of the drive member, the component-support also reciprocating in response to movement of the track with an amplitude less than that of the drive member.

The apparatus preferably forms part of friction welding apparatus which also comprises a second component-support and means operative to urge the component-supports towards each other both during the frictional generation of heat and during subsequent welding.

It is to be understood that throughout this specification the term component-support is used broadly to denote that part of the apparatus on which one of two components to be welded is supported together with any additional part or parts which are directly connected to it. The component-support may comprise a non-rotatable chuck or like device which holds the component, or it may comprise a table or other part on which such a chuck or like device is or can be mounted.

The track is normally on the component-support, though it would be possible for the track to be on a member coupled to the component-support in such a manner that any movement of the member is mirrored by a corresponding movement of the component-support.

Figure 2:
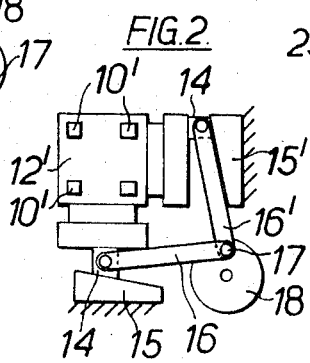
Figure 3:
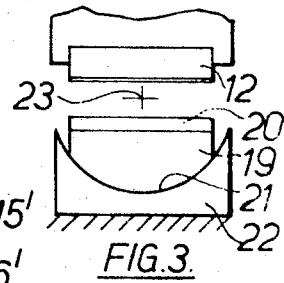
Figure 4:
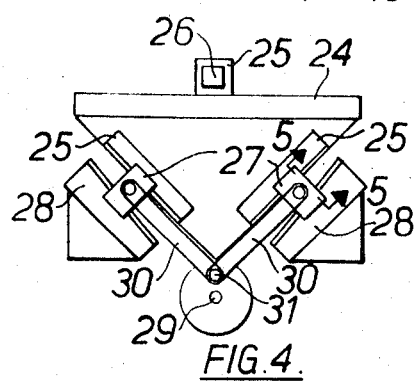
Figure 5:
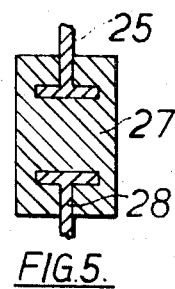
Figure 6:
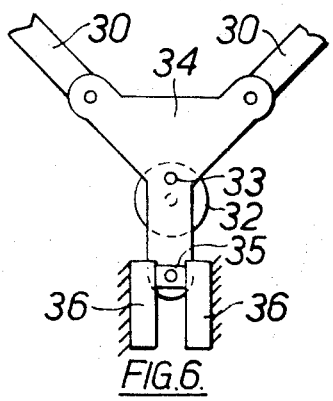
Figure 7:
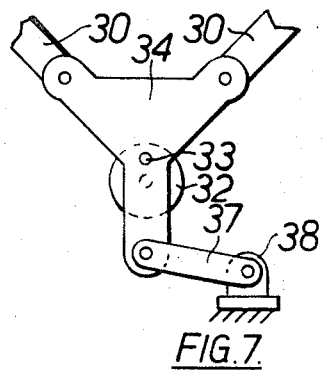
Figure 8:
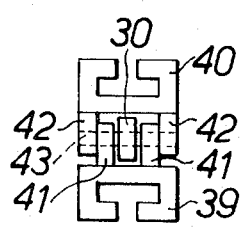
Figure 9:
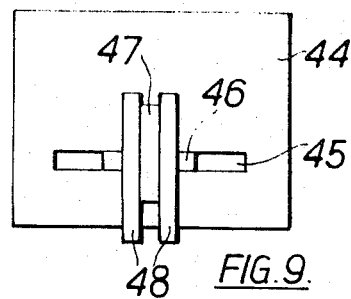
Figure 10:
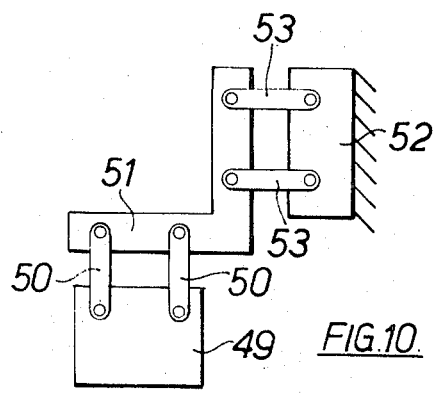
Figure 11:
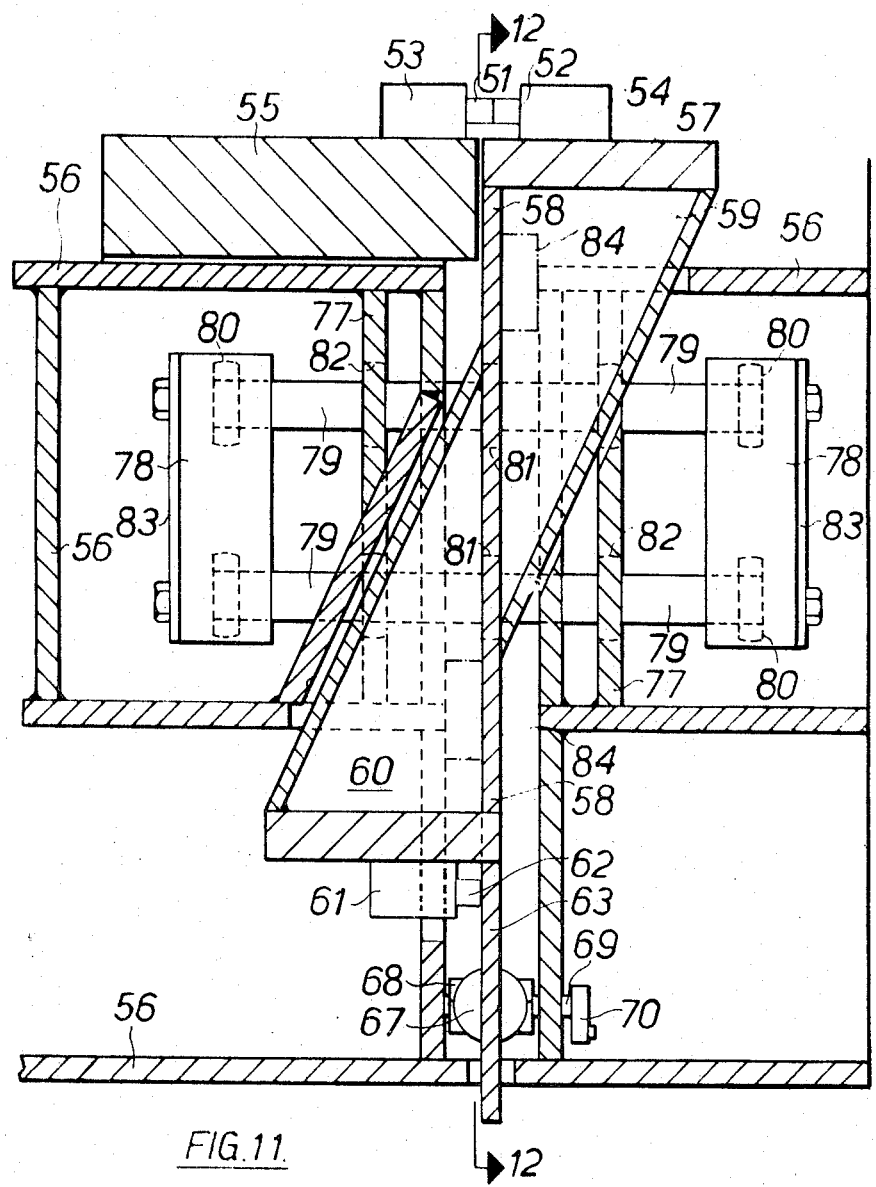
Figure 12:
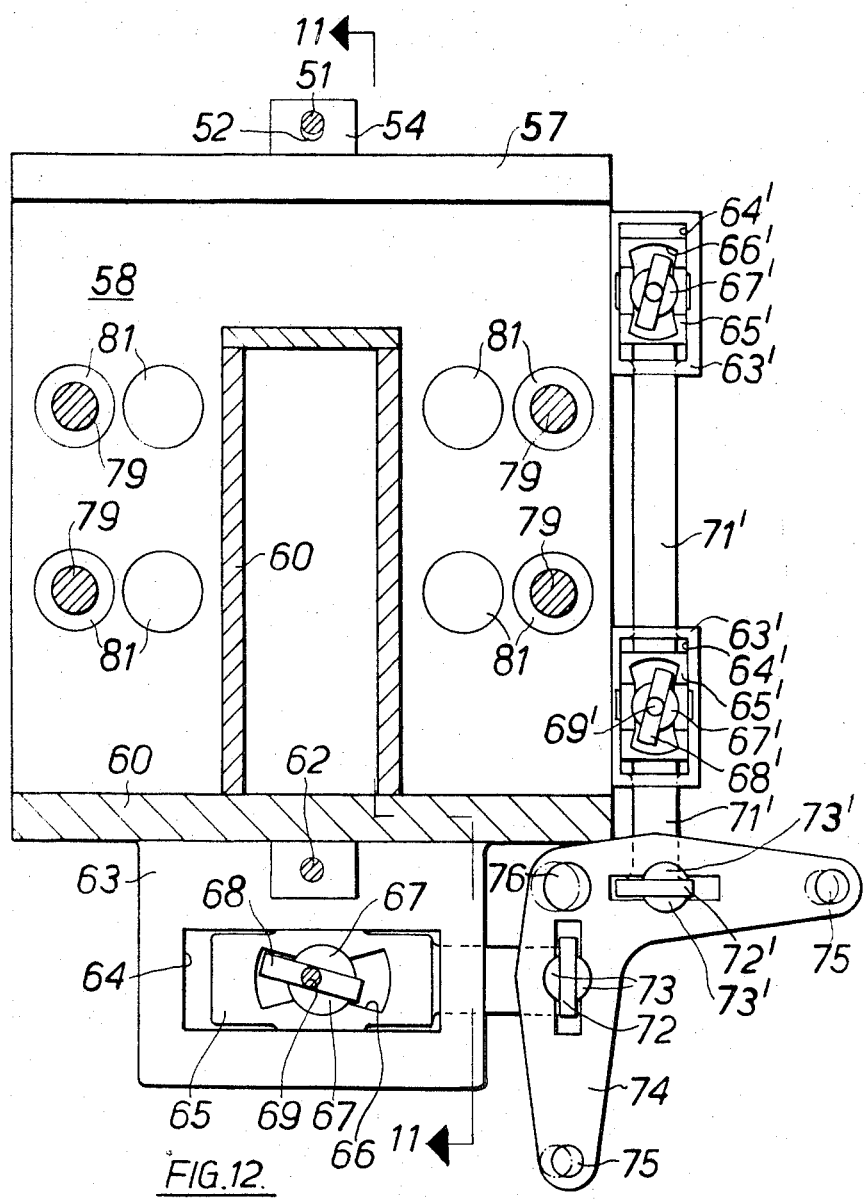

Reference will now be made to the accompanying drawings. Some of these drawings are highly diagrammatic and are intended more to indicate the general principals of the invention than to provide constructional details of the pieces of apparatus concerned. In the drawings:

FIG. 1 is a diagrammatic view of one form of apparatus embodying the invention, viewed in a direction normal to the plane in which the irrotational movement occurs, FIG. 2 is a similar view of a second form of apparatus embodying the invention, FIG. 3 is a similar view of certain components and illustrates a modification, FIG. 4 is a similar view of a third form of apparatus embodying the invention and somewhat similar to the second embodiment, FIG. 5 is a section along the line 5—5 of FIG. 4, FIG. 6 is a view illustrating a modification of the apparatus shown in FIG. 4, FIG. 7 is a view illustrating an alternative to the modification shown in FIG. 6, FIG. 8 is an end view of a drive member and illustrates a modification to the drive member sectioned in FIG. 5, FIG. 9 is an elevation of a component-support, viewed in a direction normal to the plane in which the irrotational movement occurs, and illustrates means for preventing tilting, FIG. 10 illustrates an alternative to the means shown in FIG. 9, FIG. 11 is a vertical section through friction welding apparatus incorporating a further form of apparatus embodying the invention, the section being along the line 11—11 of FIG. 12, and FIG. 12 is a section along the line 12—12 of FIG. 11.

In apparatus embodying the invention as outlined above the movable component-support may be guided to reciprocate, without rotation, along a linear path. Such an arrangement is particularly suitable for use in welding together components which are relatively long in relation to their width. Thus two metal plates, for example, can be welded together edge-to-edge with the aid of such apparatus, one being held stationary while the other is reciprocated lengthwise of the abutting edge faces.

An example is shown in FIG. 1. A component 10 is fixed in a chuck 11 on a table 12 slidable vertically between fixed guides 13. The chuck 11 and table 12 together constitute the movable component-support. The underside of the table 12 in inclined and constitutes a track. A block 14 constituting the drive member is constrained to reciprocate along the track and along a rectilinear path on a fixed member 15. The angle between the track and the path is considerably less than 45°. The block 14 is pivoted to one end of a link 16 the other end of which is coupled to a crank pin 17 on a rotating wheel 18. Reciprocation of the block 14 causes vertical reciprocation of the component-support and component with an amplitude less than that of the block.

In an alternative form of apparatus the component-support is caused to reciprocate in a direction transverse to the first direction of reciprocation and with the same frequency. This second reciprocation is preferably effected by means of a second drive member in a manner similar to the reciprocation effected by the first drive member. The path followed by the component-support will depend on the phase relationship between the two mutually transverse reciprocations and their relative amplitudes, and may be a straight line, an ellipse, a circle, or some other figure generally similar to those. If the paths and tracks followed by the drive members are truly rectilinear and the drive members reciprocate with simple harmonic motion those figures can be obtained. These conditions may not always be met, however, in which case other generally similar figures such as egg-shaped curves may be obtained.

An example of this form of apparatus is shown in FIG. 2. Parts which correspond to parts in FIG. 1 have the same reference numerals. In addition to the drive member 14 there is a second drive member 14' and associated fixed member 15' and link 16'. The guides 13 are omitted. In place of a single component 10 there are four components 10', each of which moves in a closed path and can be welded to an associated component.

The loads involved in causing a component to perform its reciprocatory movement are often very considerable, particularly when metal components are to be welded together. In the forms of apparatus proposed hitherto the component-support has been reciprocated directly from a crank-mechanism or an eccentric-mechanism so that the loads have been taken directly by such mechanism. The present invention avoids this difficulty as much of the load can be taken by non-reciprocating bearing members defining paths for the drive members. Little advantage is obtained if angle between the track and the associated path approaches 45°, but the advantage increases greatly with smaller angles. In practice the angle between the track or each track and the associated path may conveniently be about 30°, though it may be smaller and be, for example, between about 7° and about 10°. Here again, however, it must be stressed that although both the track and the path are preferably rectilinear this is not necessarily so, and either or both may be somewhat curved. In such cases the angle between them may differ from place to place, but the general principals indicated above still apply.

Where there are two drive members, the tracks on the component-support, which are followed by the drive members, are preferably at right angles to each other, as shown in FIG. 2, but this is not essential. The tracks must however be approximately at right angles and would not normally be at less than 60° or 70° to each other or more than 120° or 130° to each other. If the tracks along which the component-supports are movable are truly rectilinear and are at right angles to each other, as is the preferred arrangement, the movement of either one of the drive members will cause the component-support to move in a direction at right angles to the track associated with it, and parallel with the track associated with the other drive member.

The movement of the drive member or each drive member is conveniently derived from a rotary member, which in use rotates uniformly, the drive member being coupled by a link or otherwise to a point on the rotary member which is eccentric with respect to the axis of rotation. Where there are two drive members they may derive their movement from two separate rotary members, but preferably they derive their movements from a single rotary member. The axis of rotation of the rotary member is preferably at or near the point of intersection of the paths followed by the drive members, both drive members being coupled to a common point on the rotary member as shown in FIG. 2. In consequence the drive members move with approximately simple harmonic motion in phase quadrature so that the component-support follows a generally circular or elliptical path.

In the arrangements thus far described the path followed by the movable component-support remains unaltered. When welding is to occur, however, it is normally necessary or desirable to bring the component supported by the movable component-support to a position at the centre of the path which has been followed. In order to enable this to be effected the eccentric point on the rotary member or on each rotary member may be transferred to the axis of rotation. If this is done the rotary member or rotary members can continue to rotate without causing movement of the component-support. This centering of the formerly eccentric point can conveniently be effected with some form of variable throw crank mechanism, such as mechanism of the well-known kind incorporating one eccentric sleeve mounted on another eccentric sleeve, the sleeves being adjustable to a position in which the eccentricities cancel each other out.

Alternatively the drive member or each drive member may derive its movement from a crank arm of which the axis is inclined to and intersects the axis around which the crank arm rotates. The crank arm is movable along said axis so that the throw of a link coupled to it varies between a maximum at one end of the movement of the crank arm and zero at the other end of the movement of the crank arm. Crank mechanisms of this kind are the subject of our co-pending British patent application No. 56525/69 assigned to the present assignee, (and the equivalent West German Offenlegungsschrift No. 2,056,773) and will not be further described here. It is to be understood, however, that if suitable any of the arrangements described in that application may be used in conjunction with the present invention.

In a further alternative arrangement for centering the movable component-support the path followed by the drive member or each of the paths, and the associated track on the component-support or each of such associated tracks, are brought into mutual alignment or parallelism. When a path and its associated track are mutually aligned or are parallel, movement of the associated drive member along that path no longer causes movement of the component-support so that the component-support remains stationary even though the drive member may continue to reciprocate. In a preferred arrangement it is the direction of the path which is varied to make it parallel with the track on the component-support. This avoids the need for adjustment of parts on the component-support itself which is already moving.

Where, as is preferred, the path followed by the drive member is rectilinear, and the track on the component-support is also rectilinear, the path is preferably arranged to swing or tilt about an axis which passes through the middle of the drive member when the drive member is in the middle of its reciprocation. If some other arrangement is adopted, and the two components to be welded together are first aligned while the path is in alignment with or parallel with the track, then when the path is subsequently tilted to enable frictional heat to be generated the movable component follows a linear or orbital path which is asymmetrical with respect to the stationary component.

As explained above, much of the reaction loading of the apparatus in use is taken by the bearing members which define the pahts for the drive members. In one construction, illustrated diagrammatically in FIG. 3, a bearing member 19 defines a rectilinear path 20 and has an arcuate, convex surface 21 which engages a complementary concave surface in a fixed support 22, the bearing member being tiltable about the centre 23 of those complementary surfaces so as to tilt the path 20. This construction, though simple and effective in form is not easy to make, and in an alternative construction which is easier to manufacture the bearing member or each bearing member has parallel upwardly directed supports, one on each side, and each support carries one end of an associated trunnion which is directed outwards from the support. The two trunnions are co-axial and form, in effect, two parts of a shaft having a central gap through which the drive member can pass. The trunnions are mounted for swinging or tilting movement in fixed bearings. The axis about which the bearing member or each bearing member swings or tilts is the same as that of the previous construction illustrated in FIG. 3.

In one particular type of apparatus embodying the invention and illustrated diagrammatically in FIG. 4 there is a component-support in the form of a table 24 to which is secured a non-rotatable chuck 25, for holding a component 26 to be welded. The apparatus will be described in a position in which the table 24 is horizontal, but it will be appreciated that the apparatus may be disposed in such a manner that the table is other than horizontal. The table 24 forms the top of a rigid structure which extends downwards and inwards from opposite edges of the table so that in end elevation the component-support is generally in the shape of an isosceles right-angled triangle with its base — the table 24 — uppermost. The inclined sides of the triangle constitute tracks 25 for engagement by drive members, the tracks comprising rails of T-shaped cross-section with their webs in a common vertical plane and their flanges outside the webs and at 45° to the vertical.

Each track 25 is engaged by a reciprocable drive member in the form of a block 27 which is formed on one side with a T-shaped slot to receive the associated track rail 25. The opposite side of each block 27 is formed with a similar slot which is inclined at a relatively small angle, for example 7° or 10°, to the first slot. The second, or outer, slot engages a fixed guide rail 28 similarly inclined to the track rail 25 on the component-support. In the preferred arrangement illustrated the guide rails 28 are inclined to the vertical at a smaller angle than the track rails (which are at 45° to the vertical). The guide rails 28 define fixed paths along which the blocks 27 can reciprocate. Movement of either block 27 along its fixed path causes the component-support to move at right-angles to the track rail 25 engaged by that block, the ratio of the distance moved by the block 27 to the distance moved by the component-support being the cotangent of the angle between the track rail 25 and the guide rail 28.

If the blocks 27 are cuased to move with simple harmonic motion and in phase quadrature the component-support moves in a circular path. In practice it is sufficient for the movement of the blocks 27 to approximate to simple harmonic motion. The movement of each block 27 may be effected with the aid of a cranked shaft 29 rotating about a horizontal axis normal to the plane of movement of the component-support. The centre of each block 27 is pivoted to one end of an associated link 30, and the crank is pivoted to the other end of the link at 31. Each link 30 extends in a direction roughly parallel with the associated track and guide rail. In an alternative arrangement (not illustrated) there are two shafts with their axes in a common horizontal plane either somewhat above the level of the table 24 or a little above the level of the shaft 29.

In order to enable the components to be mutually aligned the crank is preferably such that it can be adjusted so that its axis is co-axial with the axis of rotation of the crank shaft 29 while the crank shaft continues to rotate. Apparatus of the kind described in our aforementioned application No. 56,525/69 may be used. In an alternative form of the apparatus shown in FIG. 4 the crank is not adjustable but has a fixed throw. In a modified arrangement the crank has an eccentric crank pin which engages a slot in a transverse enlargement at one end of the link connecting the crank to the associated drive member. The link is constrained to move in a rectilinear path, and the slot is at right-angles to that path. With this arrangement each drive member can perform true simple-harmonic motion. In another arrangement, illustrated in FIG. 6, the crank 32 (equivalent to cranked shaft 29) has an eccentric crank pin 33 which enters a central hole in a follower 34 of generally triangular shape. Two corners of the triangular follower are pivotally connected to the links 30 which are in turn connected to the drive members 27, while the third corner of the follower, further from the crank pin than the other two, is pivotally connected to a block 35 constrained to reciprocate between parallel guides 36, along a path aligned with the axis of rotation of the crank 32. In a modified arrangement illustrated in FIG. 7 the block 35 and parallel guides 36 are dispensed with, and the third corner of the follower is now pivoted to one end of a link 37 which extends in a direction generally at right angles to a line between the axis of the crank 32 and the third corner of the follower. The other end of the link 37 is pivoted to a fixed support 38. Thus instead of the third corner of the follower being constrained to reciprocate in a straight line it is now constrained to move along a slightly curved, arcuate path close to the straight line.

With a fixed-throw crank the guide rails 28 are normally no longer fixed but are mounted in such a manner that they can be adjusted to become parallel with their associated track rails 25. Adjustment of this kind is described above with reference to FIG. 3. As the angle between each guide rail 28 and its associated track rail 25 decreases, the length of the path followed by the component-support diminishes, and when the rails become parallel the component-support ceases to move even though the blocks 27 may continue to reciprocate.

In order to accommodate the changes in angle between the guide rails 28 and the track rails 25 each block 27 is of composite construction such as to enable those parts thereof which engage the rails to be adjusted in a complementary manner. In one construction, illustrated in FIG. 8, each block 27 comprises two parts 39 and 40 each formed with a T-shaped slot and each having a pair of spaced lugs. The lugs 41 on the part 39 lie between the lugs 42 on the part 40, and a pivot pin 43 normal to the longitudinal axes of the T-shaped slots extends through the four lugs 41 and 42. The central part of the pin 43, between the lugs, extends through one end of the associated ink 30, the other end of which is connected to a crank as described above. When the guide rails 28 are adjusted the parts 39 and 40 of the blocks pivot automatically to conform with the positions of the rails.

Each guide rail 28 extends along the straight edge of an associated segmental bearing member, the convex arcuate side of which is slidable against a complementary concave surface in a fixed support. The arrangement is such that the axis of rotation of each bearing member is coincident with the axis of the pivot pin of the associated block when the block is half-way between the ends of its travel. Such an arrangement is illustrated in FIG. 3.

Any suitable means may be provided for swinging or tilting the segmental bearing members, but it is often desirable that this movement should be effected quickly so that the components to be welded are rapidly moved from the relative positions in which heat is generated to the relative positions necessary for welding. Thus each bearing member may be swung or tilted by means of a pneumatic or hydraulic piston-and-cylinder assembly operative between the bearing member and the fixed support. If desired the movements of the two bearing members can be co-ordinated so that they move in unison. This can be effected with the aid of a linkage, a rack-and-pinion device or any other suitable coupling.

In each case the movement of the bearing members is preferably limited by adjustable stops.

Numerous modifications can be made. For example, the blocks described above are merely in sliding engagement with rails; rolling bearings may be introduced between the blocks and the rails. Further, in that type of apparatus in which the angle between each guide rail and its associated track rail is varied this variation may be effected by positively adjusting the angle between the two pivoted parts of each block, provided that each part is so linked to its associated rail as to remain in fixed angular relationship thereto. Thus each guide rail may be freely swingable or tiltable while the two parts of each block can be adjusted by means of an hydraulic piston-and-cylinder unit.

It may be desirable, or in some arrangements essential, further to restrain the component-support so that it does not tend to tilt about an axis or axes parallel with the axes of the pins 43.

One particular arrangement for providing this additional restraint is illustrated in FIG. 9. In this Figure a component-support 44 is formed with a longitudinally extensive parallel-sided slot 45. A slide bar 46 is movable longitudinally in the slot. A second slide bar 47, at right angles to the first, is welded at its centre to the centre of the dirst slide bar 46 so that the two slide bars together form an X-shaped coupling. The second slide bar 47, is movable longitudinally between fixed guides 48. The arrangement is thus similar to that of an Oldham coupling.

In an alternative arrangement, illustrated in FIG. 10, a component-support 49 is restrained by a linkage comprising two pairs of links. Each of the two links 50 of the first pair is pivoted at one end to the component-support 49, the two pivot points being well spaced apart. The links 50 are parallel with each other and of equal length, and their ends further from the component-support 49 are pivoted at spaced points along one limb of an L-shaped intermediate member 51. A parallel linkage is thus formed which enables the component-support 49 to move in an arcuate path relatively to the intermediate member 51, but prevents relative tilting movement between the component-support and the intermediate member. The other limb of the intermediate member 51 is connected to a fixed support 52 through the intermediary of the second pair of links 53 which are substantially at right-angles to the first pair of links 50 and constitute a second parallel linkage similar to that formed by the first pair of links.

One of the advantages of apparatus embodying the present invention is that the relatively large reaction forces generated by the frictional resistance to movement of the component-support during the generation of heat are at least largely transmitted through the blocks to the guide rails and bearing members and thence to the fixed supports instead of being transmitted to the cranks and crank shafts. Another advantage is that the movement of the blocks or other drive members is relatively extensive as compared with the consequential movement of the component-support, and that the forces required to move the drive members are correspondingly reduced.

A further embodiment of the invention is illustrated in FIGS. 11 and 12. Components 51 and 52 to be welded together are mounted in non-rotatable chucks 53 and 54 respectively. Chuck 53 is mounted on top of a carriage which is constrained to slide in a rectilinear path relative to a fixed framework 56 of the apparatus. Means (not shown) such as a pneumatic piston-and-cylinder unit is operative between the carriage 55 and the framework 56 to urge the carriage to the right as shown in FIG. 11.

Chuck 54 is mounted on a table 57 forming part of a movable component-support. The component-support also includes a vertical plate 58 and buttressing 59 for the table 57. The plane in which the rubbing faces of the components 51 and 52 lie is also the midplane of the plate 58. In order that the centre of gravity of the component-support should be at the centre of the plate, a balance weight 60 is provided which duplicates the mass and form of the table 57 and buttressing 59. A chuck 61 balances the chuck 54, and in use a counterweight 62 similar to the component 52 is mounted in the chuck 61.

A downward extension 63 of the plate 58 is formed with a rectangular hole 64, the upper and lower edges of which constitute tracks which are engaged by a drive member constituted by a generally rectangular plate 65. A hole 66 of butterfly shape is formed in the middle of the plate 65 and includes part-spherical portions which receive two hemispherical bearing pads 67. The diametral planes of the bearing pads 67 slidingly engage opposite sides of a guide member 68 which is mounted on a shaft 69. The shaft 69 is mounted for pivotal movement in adjacent parts of the frame 56. A crank 70 on the shaft 69 is connected to an hydraulic piston-and-cylinder unit (not shown) or other means enabling the guide member 68 to be swung rapidly between a tilted position, such as is shown in FIG. 12 and a horizontal position.

The arrangement is such that when the guide member 68 is tilted and the plate 65 is caused to reciprocate, the plate 65 follows the inclination of the guide member 68 and in addition to a main horizontal component of movement also has a small vertical component of movement. This vertical component is transmitted to the component-support through the tracks constituted by the upper and lower edges of the hole 64. The amplitude of the vertical component of movement varies with the inclination of the guide member 68; and when the guide member is horizontal the vertical movement of the component-support ceases even though the plate 65 may continue to reciprocate.

Reciprocation of the plate 65 is effected through an arm 71 extending from one side of the plate and carrying a bearing flange 72 at its further end. The flange 72 is engaged by the diametral faces of a pair of hemispherical bearing pads 73 similar to the pads 67 and mounted in part-spherical seats in an L-shaped driving body 74. The driving body 74 is mounted for movement in a circular path, without rotation. To this end the ends of its limbs are pivoted to a pair of similar eccentrics 75 of fixed eccentricity, which the middle thereof is pivoted to a driving crank 76 of the same fixed eccentricity. It will be appreciated that with this arrangement the horizontal components of movement of the driving body 74, which are sinusoidal, are transmitted to the arm 71.

A similar driving arrangement to that described above is provided in duplicate at one side of the plate 58. Similar parts are given the same reference numerals, but an index (') has been added. It will be observed that the arm 71' is common to both the driving arrangements at the side of the plate 58. The provision of duplicate driving means at the side of the plate serves to constrain the component-support against tilting and thus avoids the need to use expedients such as those illustrated in FIGS. 9 and 10.

If the guide members 68 and 68' are all inclined to the same angle, the component-support will follow a circular path without rotation, but if the guide member 68 is at a different inclination to the guide members 68' (and the inclination of each of the guide members 68' must always be the same as that of the other) the component-support will follow an elliptical path or even a rectilinear path. Similarly, when none of the guide members 68, 68' is inclined the component-support will remain stationary.

The layout of the driving body 74 is important in that the centres of each of the sets of bearing pads 73 and 73' is on a line between the centre of the driving crank 76 and one of the eccentrics 75, and its distance from the centre of that eccentric is twice its distance from the centre of the driving crank. With the aid of this arrangement it is possible to reduce any out-of-balance forces to a minimum. To this end there are three counter weights, of uniform mass, secured one to each of the eccentrics 75 and one to the driving crank 76. The mass of the three counterweights together is equal to that of the driving body 74, so that the centre of mass of the counterweights and driving body combined remains fixed. The centre of mass of the driving body is preferably in the central plane of the plate 58, and each counterweight is preferably in two equal parts, one on each side of the driving body 74 so that their centre of mass is in the same plane.

Other means are provided for counter-balancing forces set up by the rapidly reciprocating component-support.

In a preferred construction a counterweight is mounted for movement in a plane parallel to but spaced from the plane in which the component-support moves, and the counter-weight is coupled to the component-support through the intermediary of a coupling member so mounted that an intermediate point thereof remains stationary, any displacement of the component-support thus causing a displacement of the counterweight in the opposite driection. If the pivot point of the coupling member is at the centre of the coupling member the displacement of the counterweight is equal to that of the component-support. If the pivot point is nearer the component-support than it is to be counterweight the displacement of the latter will be greater than that of the former by a constant factor and the mass of the counterweight can be correspondingly reduced.

In the specific embodiment illustrated in FIGS. 11 and 12 the component-support is mounted between two fixed support plates 77 which are parallel with each other and with the directions of movement of the component-support. There are four counterweights 78, two beyond each of the support plates 77, and one of those on each side of the adjacent buttressing 59 or 60.

Each of the counterweights 78 is coupled to the plate 58 of the component-support through the intermediary of two coupling members. Each coupling member comprises a stout rod 79 provided with enlargements 80 and 81 at its ends and an enlargement 82 near its centre. Each of these enlargements 80, 81 and 82 is formed externally with a part-spherical bearing surface. The enlargement 82 is housed in a hollow bearing fixed in the associated support plate 77 so that the coupling member can swing about a point near its centre. Each of the enlargements 80 and 81 is housed in an associated bearing block mounted in the adjacent counterweight 78 or plate 58 as the case may be. Each of the bearing blocks in the plates 58 is movable in a direction normal to the plane of the plate. Thus, when the component-support is displaced in any direction each coupling member swings about its central point and causes the counterweight to which it is coupled to move in the opposite direction.

Subsidiary weights 83 are releasably attached to the counterweights 78 so as to compensate for changes in the weights of the chucks 54 and 61 and the components 52 and 62.

This system of coupling one or more counterweights to the component-support can be used in any form of friction welding apparatus in which the component-support moves in a line or plane parallel with the planes of the abutting faces of the components which are to be welded together.

Because the movements of the component-support and the counterweight or each counterweight mirror each other it would be possible to drive the counterweight or one of the counterweights and to allow the component-support and any other counterweight or counterweights to be driven by the driven counterweight. This is an example of an arrangement of the kind mentioned above where it is stated that the track may be on a member coupled to the component-support so that the movement of one mirrors the movement of the ohter. Nevertheless this arrangement is usually less satisfactory than those in which the component-support is driven direct, for the reactions on the bearings are cumulative and tend to become excessive if one counterweight is driven and that counterweight drives a component-support which in turn drives another counterweight.

Although the apparatus is described as being used to weld two components together it must be understood that the apparatus may be used to weld together simultaneously several pairs of components, one component of each pair being supported by the movable component-support.

Each of the pieces of apparatus described above with reference to the drawings can be used in friction welding apparatus of which the remainder is of generally conventional construction.

In general there will be a second component-support, which normally holds the other component or components stationary, and which may have a non-rotatable chuck or like device resemling that of the movable component-support. There will also be means to urge the components together both during the frictional generation of heat and during the subsequent welding. It is convenient for the stationary component-support to be urged towards the movable component-support, as by an hydraulic piston-and-cylinder unit, although it would be possible to cause the movable component-support to be urged towards the stationary component-support. In either case it is necessary to provide appropriate bearings to resist the axial pressure applied to the movable component-support. The positions of hydrostatic bearings for this purpose is indicated by the chain-dotted lines 84 in FIG. 11.

In a typical instance, apparatus of the kind illustrated in FIGS. 11 and 12 is adapted to move the component-support and a metal component to be welded, in a path of one eighth of an inch in radius at a speed of 3,000 cycles per minute, while a force of some five tons urges the components 51 and 52 together during the frictional generation of heat.

We claim:

1. Friction welding apparatus operative to weld two components together comprising a first component-support and a second component-support, and drive means operative to cause said first component-support to follow repeatedly a given course of movement relative to the second component-support without rotation whereby components supported by the respective component-supports and in frictional engagement with each other become heated by frictional heat, said drive means comprising first guide means defining a path, a drive member, power means operative to cause reciprocation of the drive member along said path without reciprocation of said first guide means, second guide means defining a track and reciprocable in a direction transverse to said track, the track being inclined to said path at less than 45°, the drive member also being reciprocable along said track so that reciprocation of said drive member along said path and track with a given amplitude causes reciprocation of said second guide means relative to said first guide means in a direction transverse to said track and with an amplitude less than said given amplitude, the second guide means being connected to the first component support so that the first component support moves in synchronism with the second guide means, and reaction forces arising from the frictional contact between the components are transmitted through the first component-support, the second guide means and the drive member, all of which reciprocate, to the first, non-reciprocable, guide means.

2. Friction welding apparatus according to claim 1 in which said first component-support is connected to said second guide means whereby they move in unison.

3. Friction welding apparatus according to claim 1 in which adjustment can be effected as between said first and second guide means whereby the inclination of the track relative to the path is adjustable to zero so that the amplitude of reciprocation of the first component-support can be varied to zero.

4. Friction welding apparatus according to claim 1 in which the power means includes a rotary driving crank and a crank shaft connected to the drive member, the throw of the crank being adjustable to zero whereby the amplitude of reciprocation of the drive member can be varied to zero.

5. Friction welding apparatus according to claim 1 in which there are at least two similar drive means operative to cause reciprocation of the first component-support in two mutually transverse directions.

6. Friction welding apparatus according to claim 5 in which the drive members are driven by a common power means whereby they reciprocate with the same frequency.

7. Friction welding apparatus according to claim 5 in which there are three similar drive means, two operative in parallel to cause reciprocation of the first component-support in one direction and the third operative to cause reciprocation of the first component-support in a direction transverse to said one direction.

8. Friction welding apparatus according to claim 1 in which there is counterweight means for the first component-support, and there is coupling means operative to couple the counterweight means to the first component-support in such a manner that movements of the first component-support are mirrored and balanced by the counterweight means.

\* \* \* \* \*